United States Patent [19]

Miyata et al.

[11] Patent Number: 5,626,797

[45] Date of Patent: May 6, 1997

[54] NON LINEAR OPTICAL MATERIAL AND METHOD FOR ORIENTATION THEREOF

[75] Inventors: Seizo Miyata, Houya; Kazuo Yoshinaga, Machida; Takeshi Miyazaki, Kawasaki, all of Japan

[73] Assignee: Canon Kabushiki Kaisha, Tokyo, Japan

[21] Appl. No.: 387,615

[22] Filed: Feb. 13, 1995

Related U.S. Application Data

[63] Continuation of Ser. No. 697,007, May 8, 1991, abandoned, which is a continuation of Ser. No. 629,165, Dec. 19, 1990, Pat. No. 5,037,582, which is a continuation of Ser. No. 164,414, Mar. 4, 1988, abandoned.

[30] Foreign Application Priority Data

| Mar. 6, 1987 | [JP] | Japan | 62-051786 |
| Mar. 9, 1987 | [JP] | Japan | 62-054439 |
| Jan. 29, 1988 | [JP] | Japan | 63-018812 |
| Feb. 1, 1988 | [JP] | Japan | 63-021497 |

[51] Int. Cl.⁶ ............................ F21V 9/00; G02F 1/35
[52] U.S. Cl. ................. 252/582; 252/587; 359/328
[58] Field of Search .......................... 359/326, 328; 385/122, 141; 252/582, 587, 589

[56] References Cited

U.S. PATENT DOCUMENTS

| 3,395,329 | 7/1968 | Rentzepis | 307/427 |
| 4,748,074 | 5/1988 | Pantelis et al. | 428/220 |
| 4,759,820 | 7/1988 | Calvert et al. | 252/582 |
| 4,806,579 | 2/1989 | Calvert et al. | 524/99 |
| 4,882,715 | 11/1989 | Egara et al. | 367/140 |
| 4,981,614 | 1/1991 | Miyazaki et al. | 252/587 |
| 5,011,623 | 4/1991 | Yoshinaga et al. | 252/299.5 |

FOREIGN PATENT DOCUMENTS

0205734  12/1986  European Pat. Off. .

OTHER PUBLICATIONS

D. J. Williams, "Organic Polymeric and Non–Polymeric Materials With Large Optical Nonlinearities," Angew. Chem. Int. Ed. Engl. 23 (1984), pp. 690–703.

K. D. Singer et al., "Second harmonic generation in poled polymer films," Appl. Phys. Lett., vol. 49, No. 5, Aug. 4, 1986, pp. 248–250.

*Primary Examiner*—Philip Tucker
*Attorney, Agent, or Firm*—Fitzpatrick, Cella, Harper & Scinto

[57] ABSTRACT

A nonlinear optical material comprises a solid solution of an organic guest compound having an electron donative group or an electron attractive group. The organic guest compound is contained in the nonlinear optical material preferably an oriented form through orientation under melting by application of a DC electric field. The guest compound is preferably a para-di-substituted benzene derivative represented by the formula:

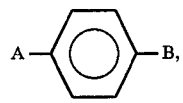

wherein A is an electron donative group and B is an electron attractive group.

16 Claims, 3 Drawing Sheets

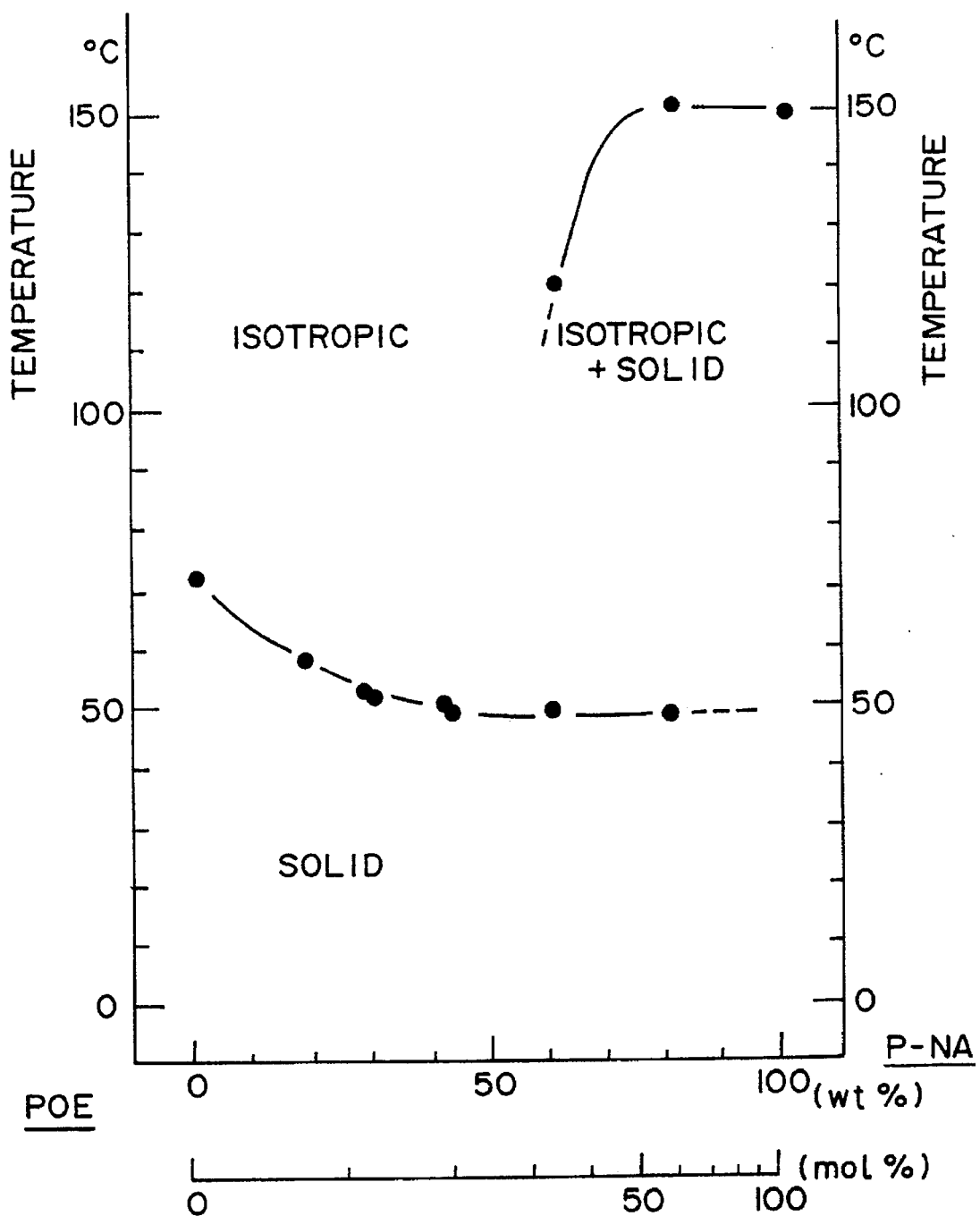
F I G. 2

NON LINEAR OPTICAL MATERIAL AND METHOD FOR ORIENTATION THEREOF

This application is a continuation of application Ser. No. 07/697,007 filed May 8, 1991, now abandoned, which is a continuation of application Ser. No. 07/629,165 filed Dec. 19, 1990, issued as U.S. Pat. No. 5,037,582 on Aug. 6, 1991, which is a continuation of application Ser. No. 07/164,414 filed Mar. 4, 1988, now abandoned.

FIELD OF THE INVENTION AND RELATED ART

The present invention relates to a nonlinear optical material, more particularly to a nonlinear optical material suitable for a waveguide in the form of a film or fiber, and a method for orientation thereof.

Heretofore, as nonlinear optical materials, inorganic single crystals of KDP, $LiNbO_3$, etc., and organic single crystals of urea, etc., have been known and used, e.g., for a wavelength conversion element for laser. However, it is technically difficult to obtain such a single crystal in a large size, and such a single crystal cannot be obtained at a low cost. In view of these problems, it has been tried to obtain a large size of single crystal in the form of a film or fiber through vapor deposition or zone melting in a capillary (Nayay, B. K.; ACS sym., 153 (1983)). By this method, however, it is not easy to control the growth of single crystal in a direction capable of phase matching required for effectively providing second harmonic generation (abbreviated as "SHG") or third harmonic generation (abbreviated as "THG").

Instead of using a single crystal, there has been known a method of adding a guest compound having a large nonlinear optical constant in host molecules and applying an electric or magnetic field for orientation of the mixture in order to control the crystalline structure.

For example, it was tried to use a polymer liquid crystal as a host and polar molecules as a guest and utilize the orienation under electric field of the polymer liquid crystal to align the polar molecules. As a result, SHG was observed under application of an electric field (Meredity, G. R., et al.; Macromolecules, 15, 1385 (1982)).

Further, as an example of alignment of polar molecules in an amorphous polymer, a polymethyl methacrylate resin with an azo colorant dissolved therein was formed into a film, heated to a temperature above the glass transition point and supplied with a voltage to align the azo colorant molecules, followed further by cooling to fix the resultant structure. As a result, a nonlinear optical constant of $6 \times 10^{-9}$ esu was observed (Singer, K. D., Sohn, J. E. and Lalama, S. J.; Appl. Phys, Lett. 49, page 248 (1986)).

It has been also proposed to mix a nonlinear optical-responsive organic compound in a polymer to obtain a polymer nonlinear optical material (U.S. Pat. No. 4,428,873; JP-A (Kokai) 57-45519). A nonlinear optical material comprising an acrylamide resin as a host polymer and a nonlinear optical-responsive organic compound as a guest has been also proposed (JP-A (Kokai) 62-84139). It has been also proposed to cause crystalline growth of a compound having an asymmetric center in a polyoxyalkylene matrix (JP-A 62-246962).

Such a polymer-type nonlinear optical material has an excellent processibility into a film, etc., while retaining its electron interaction providing a nonlinear optical effect and is regarded as a suitable material for device formation.

Such a polymer-type nonlinear optical material, however, still involves some problems. Generally, a larger nonlinear optical effect is attained proportionally as the content of a guest compound in a polymer matrix (solid solution) is increased. It is however difficult to blend a low-molecular weight polar compound as a guest in a large proportion, e.g., at least 20 wt. %, in a polymer uniformly on a molecular level, so that the guest molecules can partially cause phase separation to be crystallied.

Furthermore, such a polymer blend is liable to lose the flexibility of the polymer per se and result in a remarkable decrease in mechanical strength, especially where the content of a low-molecular weight polar guest compound is increased.

Further, as for the second order nonlinear optical effect, a guest molecule which per se has a large polarization β can show no or only a slight SHG activity when blended in a conventional polymer, if it is a centrosymmetric crystal. For this reason, it has been generally necessary to form the polymer blend into a film and orient the film as by application of an electric or magnetic field or by stretching.

Particularly, in the systems proposed heretofore, a good molecular orientation or a large nonlinear susceptibility could not be obtained because the electric field energy is smaller than the thermal energy as described in the above-mentioned report by Singer, K. D. Further, no polymer optical modulation material obtained by addition of a nonlinear optical-responsive organic compound could show a nonlinear susceptibility exceeding that of the nonlinear optical-responsive organic compound alone.

In order to obtain a large nonlinear optical effect for a nonlinear element, it has been considered to increase the energy density of incident light. For this purpose, it is necessary to use a high energy laser beam or to focus the incident light. Particularly, the focusing is important when a semiconductor laser beam is applied to a nonlinear optical element. Especially suitable for this purpose is focusing of incident light by use of a waveguide in the form of a film or fiber. A large nonlinear optical effect as a result has been reported (T. Taniguchi, JEE. High Tech. Report, November, 93 (1986)). In order to obtain such a waveguide, however, diffusion-exchange of Ti or H in a single crystal was effected, for example, for $LiNbO_3$. It took much time and the control was difficult.

SUMMARY OF THE INVENTION

An object of the present invention is to provide a nonlinear optical material which substitutes for a conventional expensive nonlinear optical material of a single crystal, has a sufficient nonlinear optical constant and is applicable for a waveguide.

A more specific object of the present invention is to provide a novel nonlinear optical material, wherein a nonlinear guest organic compound having a large polarization is easily and uniformly dissolved mutually in a host polymer compound; the second order and third order nonlinear optical effects of the guest organic compound are not lowered by blending with the host polymer compound; a flexibility is retained even if the guest organic compound is contained in a large proportion; and excellent mechanical strength and processability are retained.

Another object of the present invention is to provide a nonlinear optical material wherein a guest organic compound having a large polarization β but showing no SHG activity because of its crystalline centrosymmetry is blended within a host polymer compound to develop a large SHG activity.

Still another object of the present invention is to provide an effective orientation method for such a nonlinear optical material.

According to the present invention, there is provided a nonlinear optical material which comprises a solid solution of an organic guest compound having at least one of an electron donative group and an electron attractive group.

It has been also found more effective to use, as the guest compound, a compound of a para-di-substituted benzene structure having the electron donative group and the electron attractive group at the para positions. Based on the above knowledge, according to a specific aspect of the present invention, there is also provided a nonlinear optical material which comprises a solid solution in a polyoxyalkylene matrix of a para-di-substituted benzene derivative represented by the formula:

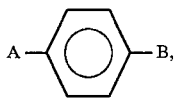 (2)

wherein A denotes an electron donative group and B denotes an electron attractive group.

According to another aspect of the present invention, there is also provided a method for orientation of a nonlinear optical material, which comprises heating the above mentioned nonlinear optical material to or above the melting temperature, and cooling the material to below the melting point while applying a direct electric field thereto.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2 is a phase diagram of a composition used in Example 8 appearing hereinafter;

DETAILED DESCRIPTION OF THE PREFERRED EMBODIMENTS

Figure 1:
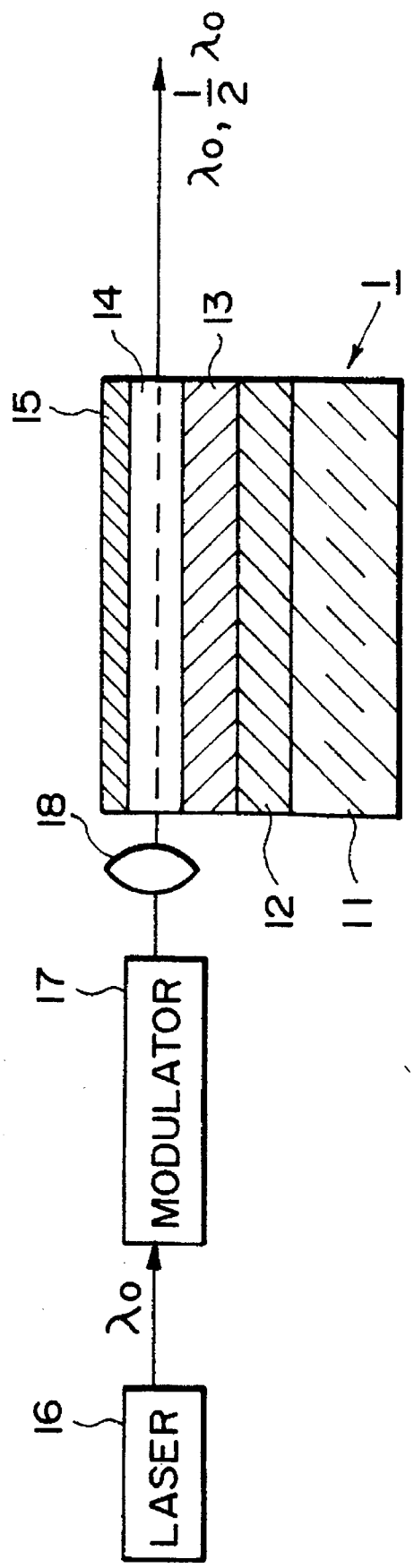
FIG. 1 is a schematic illustration of an example of an optical modulation system including a nonlinear optical element composed of a nonlinear optical material according to the present invention.

The polyoxyalkylene used in the present invention comprises oxyalkylene units represents by the formula:

$$-\!\!+\!\!R-\!\!O\!\!+_{\!\!n}, \quad (1)$$

wherein R denotes an alkylene group containing 1–6 carbon atoms (i.e., $C_1$–$C_6$ alkylene group), and n is 2 or more, preferably 10–200,000, representing the total number of the oxyalkylene units in the polyoxyalkylene. The number of the alkylene units in the polyoxyalkylene can vary widely as described above as far as the polyoxyalkylene is provided with a film-formability and contains at least two successive oxyalkylene units.

If the alkylene group R contains more than 6 carbon atoms, the polyoxyalkylene is caused to have a poor mutual solubility with the organic guest compound having an electron donative group or/and an electron attractive group, thus failing to provide a film with excellent properties. It is especially preferred that the alkylene group R contains 2–4 carbon atoms.

The polyoxyalkylene constituting the matrix of the non-linear optical material according to the present invention may be a homopolymer consisting of the units represented by the formula (1) alone but can also be a copolymer or a derivative containing the unit of the formula (1) as a partial structure including two or more, preferably 10 or more, successive polyoxyalkylene units in a proportion of 10 mol % or more, preferably 30 mol % or more in the polyoxyalkylene. Such a copolymer may assume various forms as follows.

1. A copolymer containing the unit of the formula (1) in its side chain represented by the following structure:

wherein m is 10 or more, and n1 is 2 or more. The unit $-\!\!+\!\!R\!-\!O\!\!+_{\!n1}$ can be connected to at least a part of the main chain represented by $-\!\!+\!\!A\!\!+_{\!m}$ and can also form a crosslinking structure.

2. A block polymer containing various forms of the unit (1) in its main chain as represented by the formula:

3. A copolymer assuming a cyclic structure as a combination of 1. and/or 2 as described above.

In the above, the units A, B and C may for example be one selected from the following:

recurring units derived from olefin derivatives, such as:

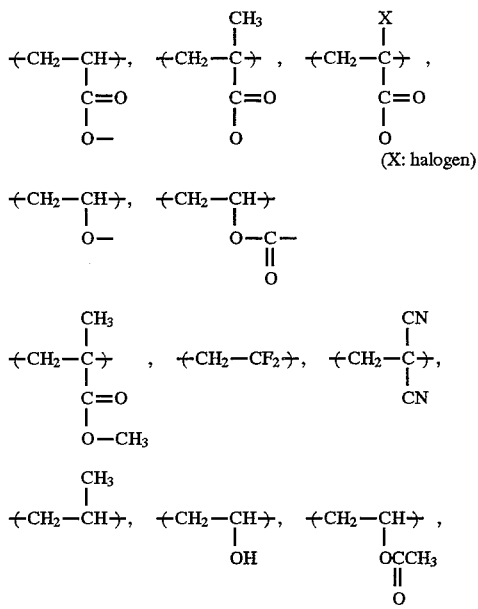

recurring units derived from diolefin derivatives, such as

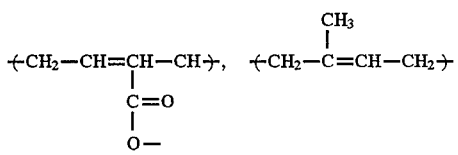

and

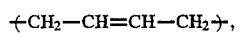

recurring units derived from diolefin derivatives, such as

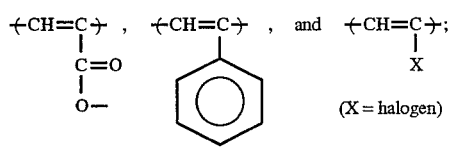

recurring units derived from ester derivatives, such as

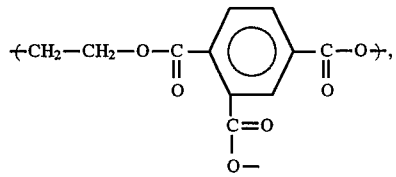

recurring units derived from azomethine derivatives such as

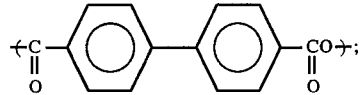

recurring units derived from imide derivatives amide derivatives, such as

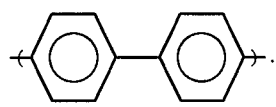

Specific examples of the polyoxyalkylene containing the unit (1) as a partial structure include those represented by the following formulas:

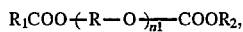

wherein R is a $C_1$–$C_6$ alkylene group, $R_1$ and $R_2$ are each a $C_1$–$C_{20}$ alkyl group, and n1 is 2 to 100,000;

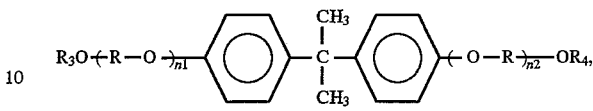

wherein R is a $C_1$–$C_6$ alkylene group, $R_3$ and $R_4$ are each H or a $C_1$–$C_{20}$ alkyl group, and n1 and n2 are each 2 to 10,000;

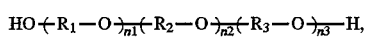

wherein $R_1$, $R_2$ and $R_3$ are each a $C_1$–$C_6$ alkylene group, and n1, n2 and n3 are each 2 to 100,000;

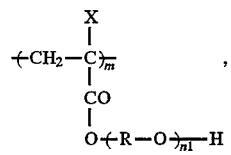

wherein R is a $C_1$–$C_6$ alkylene group, X is —H, —$CH_3$ or a halogen radical, n1 is 10 to 20,000, and m is 10 to 100,000;

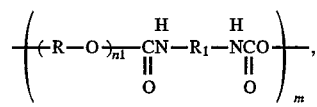

wherein R is a $C_1$–$C_6$ alkylene group, $R_1$ is a $C_1$–$C_{18}$ alkylene, cyclohexylene, phenylene, biphenylene or tolylene group, n1 is 10 to 100,000 and m is 10 to 10,000;

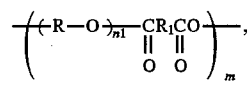

wherein R is a $C_1$–$C_6$ alkylene group, $R_1$ is a $C_1$–$C_{18}$ alkylene, cyclohexylene, phenylene, biphenylene, terphenylene or tolylene group, n1 is 10 to 100,00, and m is 10 to 10,000.

The polyoxyalkylene matrix of the present invention may be composed of the above-described polyoxyalkylene alone but can be a mixture with another material, such as polymers inclusive of poly(methyl methacrylate), poly(vinyl acetate), polystyrene, poly(vinylidene fluoride), poly(vinylidene cyanide-vinyl acetate), poly (vinylidene fluoride-tetraluoroethylene), poly(vinylidene cyanide-vinyl propionate), poly(vinylidene cyanide-vinyl benzoate), poly (vinyl alcohol), polyimide, etc., polymer liquid crystals, liquid crystals, and powder of inorganic compound. In such a case, it is preferred that the polyoxyalkylene constitutes more than 10 wt. %, particularly more than 30 wt. %, of the resultant mixture constituting the matrix.

The guest compound or dopant used in the nonlinear optical material according to the present invention may preferably be in the form of aromatic compounds, such as mono-substituted benzene derivative, di-substituted benzene derivative, tri-substituted benzene derivative, tetra-substituted benzene derivative, mono-substituted biphenyl derivative, di-substituted biphenyl derivative, tri-substituted biphenyl derivative, tetra-substituted biphenyl derivative, mono-substituted naphthalene derivative, di-substituted naphthalene derivative, tri-substituted naphthalene derivative, tetra-substituted naphthalene derivative, mono-substituted pyridine derivative, di-substituted pyridine derivative, tri-substituted pyridine derivative, tetra-substituted pyridine derivative, mono-substituted pyrazine derivative, di-substituted pyrazine derivative, tri-substituted pyrazine derivative, tetra-substituted pyrazine derivative, mono-substituted pyrimidine derivative, di-substituted pyrimidine derivative, tri-substituted pyrimidine derivative, tetra-substituted pyrimidine derivative, mono-substituted azulene derivative, di-substituted azulene derivative, tri-substituted azulene derivative, tetra-substituted azulene derivative, mono-substituted pyrrole derivative, di-substituted pyrrole derivative, tri-substituted pyrrole derivative, tetra-substituted pyrrole derivative, mono-substituted thiophene derivative, di-substituted thiophene derivative, tri-substituted thiophene derivative, tetra-substituted thiophene derivative, mono-substituted furan derivative, di-substituted furan derivative, tri-substituted furan derivative, tetra-substituted furan derivative, mono-substituted pyrylium salt derivative, di-substituted pyrylium salt derivative, tri-substituted pyrylium salt derivative, tetra-subsituted pyrylium salt derivative, mono-substituted quinoline derivative, di-substituted quinoline derivative, tri-substituted quinoneline derivative, tetra-substituted quinoline derivative, mono-substituted pyridazine derivative, di-substituted pyridazine derivative, tri-substituted pyridazine derivative, tetra-substituted pyridazine derivative, mono-substituted triazine derivative, di-substituted triazine derivative, tri-substituted triazine derivative, mono-substituted tetrazine derivative, di-substituted tetrazine derivative, mono-substituted anthracene derivative, di-substituted anthracene derivative, tri-substituted anthracene derivative, or tetra-substituted anthracene derivative.

Examples of the electron donative group attached to the guest compound as described above may include: amino group, alkyl group (methyl, ethyl, isopropyl, n-propyl, n-butyl, t-butyl, sec-butyl, n-octyl, t-octyl, n-hexyl, cyclohexyl, etc.), alkoxy group (methoxy, ethoxy, propoxy, butoxy, etc.), alkylamino group (N-methylamino, N-ethylamino, N-propylamino, N-butylamino, etc.), hydroxyalkylamino group (N-hydroxymethylamino, N-(2-hydroxyethyl)amino, N-(2-hydroxypropyl)amino, N-(3-hydroxypropyl)amino, N-(4-hydroxybutyl)amino, etc.), dialkylamino group (N,N-dimethylamino, N,N-diethylamino, N,N-dipropylamino, N,N-dibutylamino, N-methyl-N-ethylamino, N-methyl-N-propylamino, etc.), hydroxyalkyl-alkylamino group (N-hydroxymethyl-N-methylamino, N-hydroxymethyl-N-ethylamino, N-hydroxymethyl-N-ethylamino, N-(2-hydroxyethyl)-N-methylamino, N-(2-hydroxyethyl)-N-ethylamino, N-(3-hydroxypropyl)-N-methylamino, N-(2-hydroxypropyl)-N-ethylamino, N-(4-hydroxybutyl)-N-butylamino, etc.), dihydroxyalkylamino group (N,N-dihydroxymethylamino, N,N-di-(2-hydroxyethyl)amino, N,N-di-(2-hydroxypropyl)amino, N,N-di-(3-hydroxypropyl)amino, N-hydroxymethyl-N-(2-hydroxyethyl)amino, etc.), mercapto group and hydroxy group.

On the other hand, examples of the electron attractive group may include: nitro group, cyano group, haloge atom (fluorine, chlorine, bromine), trifluoromethyl group, carboxyl group, carboxy ester group, carbonyl group and sulfonyl group.

Specific examples of the guest compound which may be used in the present invention may include the following:
(1) 3-nitro-4-hydroxy-3-sodiumcarboxy-azobenzene,
(2) 4-chloro-2-phenylquinazoline,
(3) aminoadipic acid,
(4) aminoanthracene,
(5) aminobiphenyl,
(6) 2-amino-5-bromobenzoic acid,
(7) 1-amino-5-bromobenzoic acid,
(8) 1-amino-4-bromonaphthalene,
(9) 2-amino-5-bromopyridine,
(10) amino-chlorobenzenesutfonic acid,
(11) 2-amino-4-chlorobenzoic acid,
(12) 2-amino-5-chlorobenzoic acid,
(13) 3-amino-4-chlorobenzoic acid,
(14) 4-amino-2-chlorobenzoic acid,
(15) 5-amino-2-chlorobenzoic acid,
(16) 2-amino-5-chlorobenzonitrile,
(17) 2-amino-5-chlorobenzophenone,
(18) amino-chlorobenzotrifluoride,
(19) 3-amino-6-chloromethyl-2-pyrazinecarbonitrile-4oxide,
(20) 2-amino-4-chloro-6-methylpyridine,
(21) 1-amino-4-chloronaphthalene,
(22) 2-amino-3-chloro-1,4-naphthoquinone,
(23) 2-amino-4-chloro-5-nitrophenol,
(24) 2-amino-4-chloro-5-nitrotoluene,
(25) 2-amino-4-chloro-4-phenol,
(26) 2-amino-5-chloropurine,
(27) 2-amino-5-chloropyridine,
(28) 3-amino-2-chloropyridine,
(29) 5-amino-2-chloropyridine,
(30) aminochrysene,
(31) 2-amino-p-cresol,
(32) 3-amino-p-cresol,
(33) 4-amino-p-cresol,
(34) 4-amino-m-cresol,
(35) 6-amino-m-cresol,
(36) 3-aminocrotononitrile,
(37) 6-amino-3-cyano-2,4-dimethylpyridine,
(38) 5-amino-6-cyano-2-pyrazinyl acetate,
(39) 4-[N-(2-methyl-3-cyano-5-pyrazinylmethyl)amino]-benzoic acid,
(40) 3,5-dinitroaniline,
(41) 4-(2,4-dinitroanilino)phenol,
(42) 2,4-dinitroanisol,
(43) 2,4-dinitrobenzaldehyde,
(44) 2,6-dinitrobenzaldehyde,
(45) 3,5-dinitrobenzamide,
(46) 1,2-dinitrobenzene,
(47) 1,3-dinitrobenzene,
(48) 3,4-dinitrobenzoic acid,
(49) 3,5-dinitrobenzoic acid,
(50) 3,5-dinitrobenzonitrile,
(51) 2,6-dinitro-p-cresol,
(52) 4,6-dinitro-o-cresol,
(53) 2,4-dinitrodiphenylamine,
(54) dinitrodurene,
(55) 2,4-dinitro-N-ethylaniline,
(56) 2,7-dinitrofluorenone,
(57) 2,4-dinitrofluorobenzene,
(58) 1,3-dinitronaphthalene,
(59) 1,5-dinitronaphthalene,
(60) 1,8-dinitronaphthalene,
(61) 2,4-dinttrophenol,
(62) 2,5-dinitrophenol,
(63) 2,4-dinitrophenylhydrazine,

(64) 3,5-dinitrosalicylic acid,
(65) 2,3-dinitrotoluene,
(66) 2,4-dinitrotoluene,
(67) 2,6-dinitrotoluene,
(68) 3,4-dinitrotoluene,
(69) 9-nitroanthracene,
(70) 4-nitroanthranilic acid,
(71) 2-amino-5-trifluoromethyl-1,3,4-thiazole,
(72) 7-amino-4-(trifluoromethyl)-coumarine,
(73) 9-cyanoanthracene,
(74) 3-cyano-4,6-dimethyl-2-hydroxypyridine,
(75) 5-cyanoindole,
(76) 2-cyano-6-methoxybenzothiazole,
(77) 9-cyanophenanthrene,
(78) cyanuric chloride,
(79) 1,2-diaminoanthraquinone,
(80) 3,4-diaminobenzoic acid,
(81) 3,5-diaminobenzoic acid,
(82) 3,4-diaminobenzophenone,
(83) 2,4-diamino-6-(hydroxymethy)pteridine,
(84) 2,6-diamino-4-nitrotoluene,
(85) 2,3-dicyanohydroquinone,
(86) 2,6-dinitroaniline,
(87) 2-amino-5-iodobenzoic acid,
(88) aminomethoxybenzoic acid,
(89) 2-amino-4-methoxybenzothiazole,
(90) 2-amino-6-methoxybenzothiazole,
(91) 5-amino-2-metoxyphenol,
(92) 5-amino-2-methoxypyridine,
(93) 2-amino-3-methylbenzoic acid,
(94) 2-amino-5-methylbenzoic acid,
(95) 2-amino-6-methylbenzoic acid,
(96) 3-amino-4-methylbenzoic acid,
(97) 4-amino-3-methylbenzoic acid,
(98) 2-amino-4-methylbenzophenone,
(99) 7-amino-4-methylcoumarin,
(100) 3-amino-5-methylisoxazole,
(101) 7-amino-4-methy-1,8-naphthylidene-2-ol.

As described hereinbefore, a preferred class of the guest compounds are those of a para-di-substituted benzene structure, particularly those represented by the formula (1) above having both an electron donative group and an electron attractive group. Examples thereof may include the following:
(111) 4-aminoacetophenone,
(112) 4-aminobenzoic acid,
(113) 4-amino-α,α,α-trifluorotoluene,
(114) 4-amino-benzonitrile,
(115) 4-aminocinnamic acid,
(116) 4-aminophenol,
(117) 4-bromotoluene,
(118) 4-bromoaniline,
(119) 4-bromoanisole,
(120) 4-bromobenzaldehyde,
(121) 4-bromobenzonitrile,
(122) 4-chlorotoluene,
(123) 4-chloroaniline,
(124) 4-chloroanisole,
(125) 4-chlorobenzaldehyde,
(126) 4-chlorobenzonitrile,
(127) 4-chanobenzaldehyde,
(128) α-cyano-4-hydroxycinnamic acid,
(129) 4-cyanophenol,
(130) 4-cyanopyridine-N-oxide,
(131) 4-fluorotoluene,
(132) 4-fluoroaniline,
(133) 4-fluoroanisole,
(134) 4-fluorobenzaldehyde,
(135) 4-fluorobenzonitrile,
(136) 4-nitroaniline,
(137) 4-nitrobenzamide,
(138) 4-nitrobenzojc acid,
(139) 4-nitrobenzyl alcohol,
(140) 4-nitrocinnamaldehyde,
(141) 4-nitrocinnamic acid,
(142) 4-nitrophenol,
(143) 4-nitrophenetole,
(144) 4-nitrophenyl acetate,
(145) 4-nitrophenylhydrazine,
(146) 4-nitrophenyl isocyanate
(147) 4-nitrotoluene
(148) 4-nitro-α,α,α-trifluorotoluene.

The guest compound as described above may be contained in the nonlinear optical material according to the present invention in a proportion of 5–80 wt. parts, preferably 10–70 wt. parts, per 100 wt. parts of the polyoxyalkylene matrix. Too little guest compound is not desirable because of a small nonlinear susceptibility. On the other hand, too much guest compound is not desirable because the resultant nonlinear optical material loses a polymer characteristic.

The para-di-substituted benzene derivative represented by the formula (1) has a large intra-molecular dipole moment because it has an electron donative group and an electron attractive group at its para positions. On the other hand, the second order micro-nonlinear optical constant or polarization of a molecule is represented by the following formula:

$$\beta = -\frac{e^3}{2\hbar^2}(r_{i(gn)})^2 \Delta r_{i(n)} \frac{\omega^2(ng)}{(\omega^2_{(ng)} - \omega^2)(\omega^2_{(ng)} - 4\omega^2)},$$

wherein $\omega_{(ng)}$ denotes an energy difference between the ground and excited state; h, the Planch's constant, $ri_{(gn)}$, a dipole matrix element between the ground and excited states; e, a unit electron charge; and $\Delta ri_{(n)} = ri_{(nn)} - ri_{(gg)}$ (Ward, J. F.; Review of Modern Physics, Vol. 37, page 1 (1965)). As is understood from the above equation, a benzene derivative having polar substituents at its para-positions and having a large dipole moment provides a large second-order nonlinear constant β. However, a compound having a large dipole moment, such as a para-di-substituted benzene derivative, is liable to have an inversion symmetrical center and does not cause SHG in most cases.

It contrast thereto, in the nonlinear optical material according to the present invention, it has become possible to cause such a para-di-substituted benzene derivative to show an SHG activity by adding it as a guest in the polyoxyalkylene matrix. In other words, in the present invention, it has become possible to remove the inversion symmetrical center or centrosymmetry of such a compound having a large dipole moment by the presence of the polyoxyalkylene matrix. It is considered that the removal of the centrosymmetry may be caused because the polyoxyalkylene forms helixes in its crystalline state and the above-mentioned guest compound is uniaxially orientd on aligned between the helixes.

Because the quest compound interacts with the helical structure of the polyoxyalkylene matrix to be uniaxially oriented, phase separation or ununiform crystallization is not caused even if the guest compounds is contained in a large proportion. Similarly, because the helical structure of the polyoxyalkylene matrix is retained, the nonlinear optical material according to the present invention retains good flexibility and mechanical strength and is suitably used in the form of a film or fiber.

Further, because the polyoxyalkylene matrix and the guest compound are aligned in a unique manner through the interaction therebetween in the nonlinear optical material of the invention, the nonlinear optical material can assume a high degree of orientation through an orientation treatment under the action of electric field, magnetic field, stretching, etc., to an extent which cannot be realized in principle based on the above-mentioned reports by Meredity, G. R. et al and Singer, K. D., et al.

As such an orientation treatment, it is desirable to heat the nonlinear optical material to a temperature above the melting point where the polyoxyalkylene matrix and the guest compound do not interact with each other, and cool the mixture to below the melting point while applying an electric field in a direction equal to the photoelectric field of incident light for causing a nonlinear optical effect. At this time, an excellent nonlinear optical effect is attained by cooling the material at a rate of 100° C./sec or below, preferably 10° C./sec or below, so as to maximize the interaction between the polyoxyalkylene matrix and the guest compound under the action of the electric field.

Figure 3:
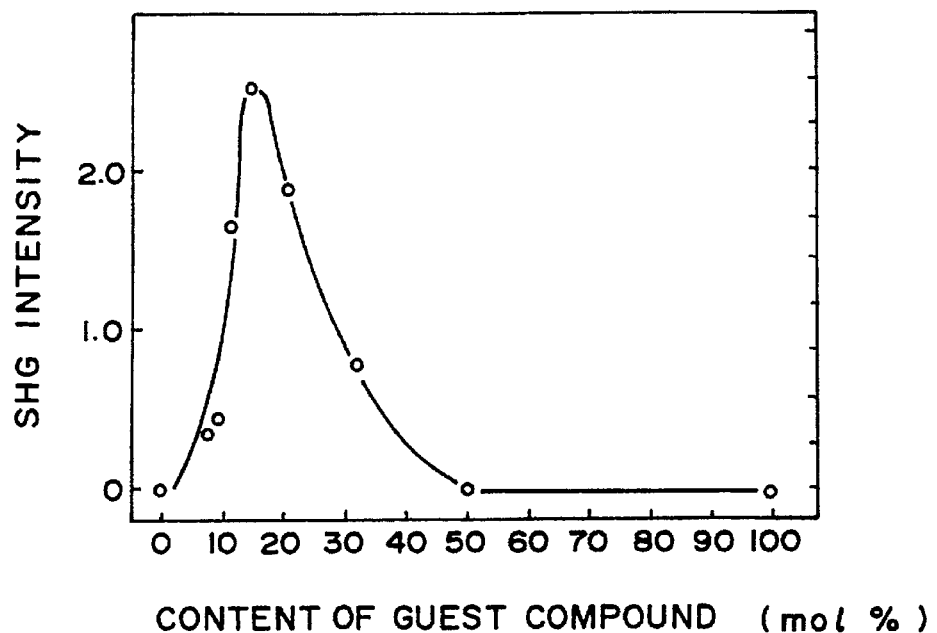
FIG. 3 is a graph showing the dependence of the nonlinear optical effect of a nonlinear optical material system on the compositional change of the system.
Figure 4:
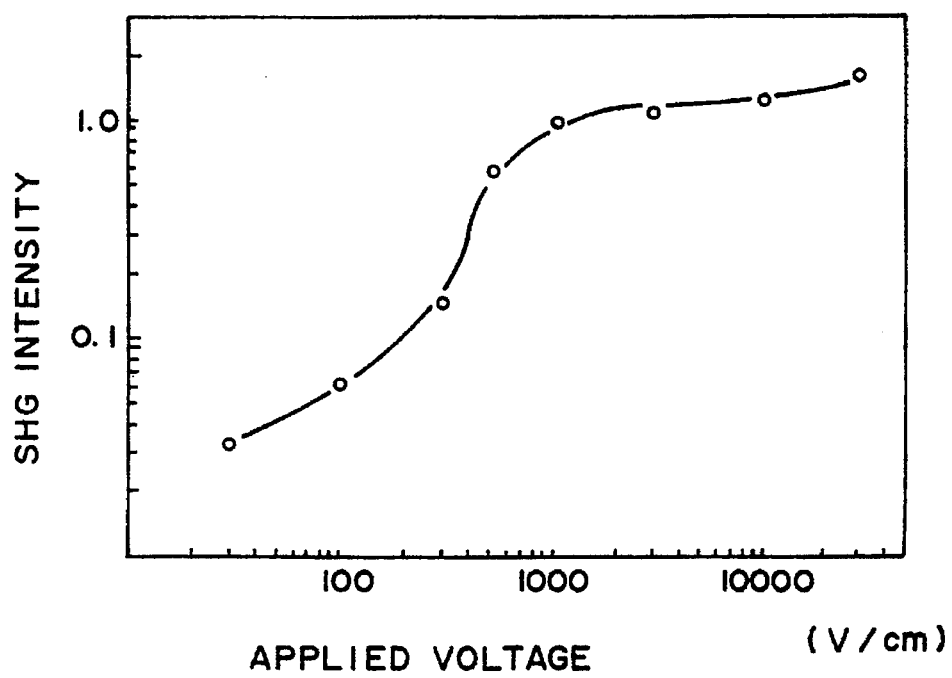
FIG. 4 is a graph showing the dependence of a nonlinear optical effect of a nonlinear optical material on applied voltage.

FIGS. 3 and 4 show patterns of changes in SHG intensity of a nonlinear optical material system oriented under an electric field dependent on the content of a guest compound at a constant electric field (FIG. 3) and depending on the electric field intensity at a certain composition (FIG. 4), respectively.

When the nonlinear optical material according to the present invention is subjected to an orientation treatment as described above, the dipole moments of the guest compound molecules therein are uniformly aligned in the electric field direction so as to provide the largest micro-nonlinear optical constant $\beta$ in a direction perpendicular to the film surface. As a result, the nonlinear optical effect as a film waveguide can be utilized to the maximum.

Similar orientation or molecular alignment effect can be obtained by heating the nonlinear optical material to above the melting point, followed by cooling under the application of a magnetic field. The nonlinear optical material can also be stretched for effective orientation.

The nonlinear optical material according to the present invention may for example be formed into a nonlinear optical element in the form of, e.g., a film having a thickness of, e.g., 0.01 to 100 mm, by adding the guest compound having an electron donative group and/or a electron attractive group into a solution of the polyoxyalkylene in an appropriate solvent, such as benzene, acetonitrile and lower alcohols to prepare a uniform solution and forming the solution into a film as by casting, spin coating, dipping, etc., followed by drying. At this time, it is preferable to effect heating at a temperature of 40°–120° C. in order to provide a good film with good compatibility between the polyoxyalkylene matrix and the guest compound. As described above, it is preferable to apply a DC electric field of, e.g., 50 V/cm–$10^6$ V/cm, preferably 100 V/cm–$10^5$ V/cm to the film above the melting point and cool the film under the electric field. The application of the DC electric field may be effected, e.g., by providing electrodes on both sides of the film or by corona discharging.

In the nonlinear optical material thus formed according to the present invention either before or after the orientation treatment, the guest compound is present in the form of a solid solution in the polyoxyalkylene matrix. The fact that the guest compound is in its solid solution state, i.e., free from crystallization, may for example be confirmed by the absence of an X ray diffraction peak attributable to the crystal of the guest compound when a sample nonlinear optical material, of e.g., a 0.1 to 2 mm-thick film, is subjected to the reflection X-ray analysis by means of an X-ray diffractometer (e.g., Model RAD-III, available from Rigaku Denki K. K.) or by the absence of a heat-absorption peak or shoulder attributable to the crystal of the guest compound when a sample is subjected to heating at a temperature at a rate of 5°–10° C./min by means of a DSC (differential scanning calorimeter).

FIG. 1 schematically illustrates an example of an optical modulation system incorporating a nonlinear optical material 1 shown in the form of a section comprising therein a waveguide 14 formed of a nonlinear optical material according to the present invention. Referring to FIG. 1, the nonlinear optical material 1 comprises a substrate 11 of, e.g. glass, plastic, etc.; a lower electrode 12 formed of a conductor, such as ITO (indium-tin-oxide), tin oxide, indium oxide, gold, silver, copper or aluminum; a low-reflective index layer 14 in the form of a film of an organic material such as vinylidene fluoride-trifluoroethylene copolymer or an inorganic material such as $SiO_2$; the waveguide 14 of a nonlinear optical material according to the present invention in a thickness of, e.g., 0.1 to 10 microns, preferably 0.3 to 3 microns, and an upper electrode 15 of, e.g., aluminum.

In operation, a laser beam having a wavelength of $\lambda_0$ emitted from a laser source 16 after passing through an optical modulator 17 such as an optical switching element or an optical deflector and a condenser lens 18 is incident on the nonlinear optical material 1 to be converted into a second harmonic having a wavelength $\lambda_0/2$ for output.

Hereinbelow, the present invention is explained based on Examples.

EXAMPLE 1

A glass substrate coated with a vapor-deposited aluminum film was further spin-coated with a solution obtained by dissolving 2.03 g (40 mmol) of polyoxyethylene with a molecular weight of $5 \times 10^6$ and 0.38 g (2 mmol) of 1-amino-4-nitronaphthalene in 5 ml of benzene for 5 hours, followed by drying at 60°–80° C. to obtain an about 1 micron-thick uniform film. Further, an aluminum electrode was formed thereon by sputtering to obtain a waveguide-type nonlinear optical element. The element was heated at 80° C. and then cooled to room temperature under the application of an electric field of 100 V between the aluminum electrodes on both ides. The nonlinear optical element was irradiated with an Nd-YAG laser beam (wavelength ($\lambda$)=1.064 microns) after focusing, whereby the generation of a second harmonic (wavelength ($\lambda$)=0.532 micron) was observed through a photomultiplier.

EXAMPLE 2

A glass substrate coated with a vapor-deposited aluminum film was further spin-coated with a 5 wt. % solution of vinylidene fluoride-tetrafluoro-ethylene copolymer in MEK, followed by drying to form a film thereon. The glass substrate was further spin-coated with a solution obtained by dissolving 1.03 g (23 mmol) of polyoxyethylene with a molecular weight of $5 \times 10^6$ and 0.20 g (1 mmol) of 2,4-dinitrophenyl-hydrazine in 10 ml of acetonitrile, followed by drying at 60°–80° C. to obtain an about 1 micron-thick uniform film. Further, an aluminum electrode was formed thereon by sputtering to obtain a waveguide-type nonlinear optical element. The element was heated at 80° C. and then cooled to room temperature under the application of an electric field of 200 V between the aluminum electrodes on both sides. The nonlinear optical element was irradiated with an Nd-YAG laser beam (wavelength (λ)=1.064 microns) after focusing, whereby the generation of a second harmonic wavelength (λ)=0.532 micron) was observed through a photomultiplier.

EXAMPLE 3

1.0 g of polyethylene qlycol distearate (RCOO (CH$_2$CH$_2$O)$_n$COOR, R=C$_{17}$H$_{35}$, averaqe molecular weight (Mw of about 1500): "Emanon 3299" available from Kao K. K.) and 0.2 g of 4-nitro-4'-iodobiphenyl were added to 3 ml of methanol and the mixture was dissolved under heating for 1 hour. The resultant solution was cast onto a petri dish to be formed into an about 200 micron-thick uniform film.

An aluminum foil was applied onto both sides of the film, and the laminate was heated to 80° C. and then gradually cooled to room temperature while applying a DC electric field of 1000 V. The electrodes were removed from the film, and the film was irradiated with an Nd-YAG laser (λ=1.064 microns), whereby an optical second harmonic (λ=0.532 micron) was observed in scattered light through a photo-multiplier at an intensity about 3 times that obtained with urea according to the powder method.

EXAMPLE 4

1.0 g of a polyethylene glycol derivative (Mw=about 345; "DA-350F" available from Nihon Yushi K. K.) represented by the formula:

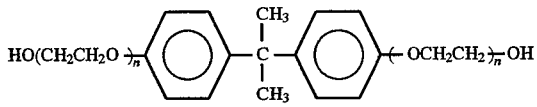

and 0.2 g of 4-methoxy-4'''-cyanoterphenyl were added to 20 ml of ethanol and the mixture was dissolved under heating for 1 hour. The resultant solution was cast onto a petri dish to be formed into an about 200 micron-thick uniform film.

An aluminum foil was applied onto both sides of the film, and the laminate was heated to 80° C. and then gradually cooled to room temperature while applying a DC electric field of 1000 V. The electrodes were removed from the film, and the film was irradiated with an Nd-YAG laser (λ=1.064 microns), whereby an optical second harmonic (λ=0.532 micron) was observed in scattered light through a photo-multiplier at an intensity about 4 times that obtained with urea according to the powder method.

EXAMPLE 5

1.0 g of an ethylene oxide-propylene oxide block copolymer (Mw=3250; "PE-68" available from Sanyo Kasei K. K.) represented by the formula:

and 0.2 g of 2-(4'-amino)-5,6-dicyano-1,4-pyradine were dissolved in a solvent mixture of 20 ml of benzene and 10 ml of methanol under heating. The resultant solution was cast onto a petri dish to be formed into an about 100 micron-thick uniform film.

An aluminum foil was applied onto both sides of the film, and the laminate was heated to 80° C. and then gradually cooled to room temperature while applying a DC electric field of 1000 V. The electrodes were removed from the film, and the film was irradiated with an Nd-YAG laser (λ=1.064 microns), whereby an optical second harmonic (λ=0.532 micron) was observed in scattered light through a photo-multiplier at an intensity about 2 times that obtained with urea according to the powder method.

EXAMPLE 6

1.0 g of polyoxyethylene (Mw=5×10$^6$), 0.25 g of butyral resin ("BL-1" available from Sekisui Kagaku K. K.) and 0.25 g of 1-amino-4-nitronaphthalene were dissolved in a solvent mixture of 20 ml of benzene and 10 ml of methanol under heating. The resultant solution was cast onto a petri dish to be formed into an about 200 micron-thick uniform film.

An aluminum foil was applied onto both sides of the film, and the laminate was heated to 80° C. and then gradually cooled to room temperature while applying a DC electric field of 1000 V. The electrodes were removed from the film, and the film was irradiated with an Nd-YAG laser (λ=1.064 microns), whereby an optical second harmonic (λ=0.532 micron) was observed in scattered light through a photo-multiplier at an intensity about 3 times that obtained with urea according to the powder method.

EXAMPLE 7

1.03 g (23 mmol) of polyoxyethylene (POE) (Mw=2×10$^4$) and 0.44 g (3 mmol) of para-nitroaniline (P-NA) were added to 10 ml of benzene and dissolved under heating for 5 hours. The solution was charged onto a petri dish and dried at 60°–80° C. to obtain a uniform film.

The film was irradiated with an Nd-YAG laser (λ=1.064 microns), whereby an optical second harmonic (λ=0.532 micron) was observed through a photo-multiplier at an intensity of about 5% of that obtained with urea according to the powder method.

EXAMPLE 8

Polyoxyethylene (POE) (Mw=6×10$^5$) and para-nitroaniline (P-NA) in various proportions were dissolved in acetonitril under heating in a similar manner as in Example 7 and the resultant solutions were respectively dried on a petri dish to form several compositions in the form of films.

The compositions were subjected to measurement of phase transition temperatures by means of a differential scanning calorimeter ("DSC-7" available from Perkin Elmer Inc.). FIG. 2 shows a phase diagram of this system based on the results of the abov measurement.

EXAMPLE 9

2.12 g (48 mmol) of polyoxyethylene (Mw=5×10$^6$) and 1.57 g (11 mmol) of para-nitroaniline were dissolved in 100 ml of acetonitril under heating for 5 hours. The solution was cast on a petri dish and dried at 60°–80° C. to form a 200 micron-thick uniform film.

An aluminum foil was applied on both sides of the film, and the laminate was heated to 80° C. under application of a DC electric field of 1000 V and then gradually cooled to room temperature. After removing the electrodes, the film was irradiated with an Nd-YAG film (λ=1.064 microns), whereby an optical second harmonic (λ=0.532 microns) was observed through a photomultiplier at an intensity of about 8 times that obtained with urea according to the powder method.

EXAMPLE 10

1.0 g of polyethylene glycol distearate (RCOO (CH$_2$CH$_2$O)$_n$COOR, R=C$_{17}$H$_{35}$, average molecular weight (Mw): "Emanon 3299" available from Kao K. K.) and 0.2 g of para-nitroaniline were added to 30 ml of methanol and the mixture was dissolved under heating for 1 hour. The resultant solution was cast onto a petri dish to be formed into an about 200 micron-thick uniform film.

An aluminum foil was applied onto both sides Rof the film, and the laminate was heated to 80° C. and then gradually cooled to room temperature while applying a DC electric field of 1000 V. The electrodes were removed from the film, and the film was irradiated with an Nd-YAG laser (λ=1.064 microns), whereby an optical second harmonic (λ=0.532 micron) was observed in scattered light through a photomultiplier at an intensity about 6 times that obtained with urea according to the powder method.

EXAMPLE 11

1.0 g of a polyethylene glycol derivative (Mw=about 345; "DA-350F" available from Nihon Yushi K. K.) representd by the formula:

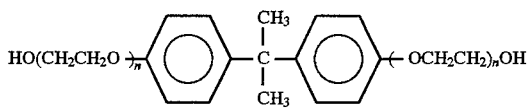

and 0.2 g of p-nitroaniline were added to 20 ml of ethanol and the mixture was dissolved under heating for 1 hour. The resultant solution was cast onto a petri dish to form an about 200 micron-thick uniform film.

An aluminum foil was applied onto both sides of the film, and the laminate was heated to 80° C. and then gradually cooled to room temperature while applying a DC electric field of 1000 V. The electrodes were removed from the film, and the film was irradiated with an Nd-YAG laser (λ=1.064 microns), whereby an optical second harmonic (λ=0.532 micron) was observed in scattered light through a photomultiplier at an intensity about 8 times that obtained with urea according to the powder method.

EXAMPLE 12

1.0 g of an ethylene oxide-propylene oxide block copolymer (Mw=3250; "PE-68" available from Sanyo Kasei K. K.) represented by the formula:

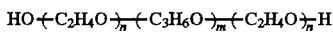

and 0.2 g of p-nitroaniline were dissolved in a solvent mixture of 20 ml of benzene and 10 ml of methanol under heating. The resultant solution was cast onto a petri dish to form into an about 200 micron-thick uniform film.

An aluminum foil was applied onto both sides of the film, and the laminate was heated to 80° C. and then gradually cooled to room temperature while applying a DC electric field of 1000 V. The electrodes were removed from the film, and the film was irradiated with an Nd-YAG laser (λ=1.064 microns), whereby an optical second harmonic (λ=0.532 micron) was observed in scattered light through a photomultiplier at an intensity about 8 times that obtained with urea according to the powder method.

EXAMPLE 13

1.0 g of polyoxyethylene (Mw=5×10$^6$), 0.25 g of butyral resin ("BL-1" available from Sekisui Kagaku K. K.) and 0.25 g of p-nitroaniline were dissolved in a solvent mixture of 20 ml of benzene and 10 ml of methanol under heating.

The resultant solution was cast onto a petri dish to form into an about 200 micron-thick uniform film.

An aluminum foil was applied onto both sides of the film, and the laminate was heated to 80° C. and then gradually cooled to room temperature while applying a DC electric field of 1000 V. The electrodes were removed from the film, and the film was irradiated with an Nd-YAG laser (λ=1.064 microns), whereby an optical second harmonic (λ=0.532 micron) was observed in scattered light through a photomultiplier at an intensity about 15 times that obtained with urea according to the powder method.

EXAMPLE 14

1.0 g of polyoxytetramethylene glycol (Mw=3000; "PTMG 3000" available from Sanyo Kasei K. K.) and 0.2 g of para-nitroaniline were dissolved under heating in a mixture solvent of 30 ml of benzene and 10 ml of methanol. The resultant solution was cast onto a petri dish to form an about 200 micron-thick uniform film An aluminum foil was applied onto both sides of the film, and the laminate was heated to 80° C. and then gradually cooled to room temperature while applying a DC electric field of 1000 V. The electrodes were removed from the film, and the film was irradiated with an Nd-YAG laser (λ=1.064 microns), whereby an optical second harmonic (λ=0.532 micron) was observed in scattered light through a photomultiplier at an intensity about 10 times that obtained with urea according to the powder method.

As described above, the nonlinear optical material according to the present invetion can be very easily formed into a waveguide in the form of a film or fiber. By using a nonlinear optical element thus formed in a simple structure, a large nonlinear optical effect can be obtained. Based on these effects, the nonlinear optical material according to the present invention can be formed into a nonlinear optical element which is applicable to an optical integrated circuit or an opto-electronic integrated circuit.

Further, according to the present invention, it has become possible to convert a polyoxyalkylene and a para-disubstituted benzene derivative not showing a nonlinear optical effect into a nonlinear optical material showing a large nonlinear optical effect (SHG) which is expected from an inherently or potentially large micro nonlinear optical constant. The thus composed nonlinear optical material can be formed into a film having excellent mechanical and optical properties, so that it is readily applicable to an optical integrated circuit and an opto-electronic circuit.

What is claimed is:

1. An optical modulation system comprising:
   a laser, and
   an optical modulator including a film of a nonlinear optical material and an electrode disposed on said film, said nonlinear optical material, comprising: a solid solution of from 5–80 parts by weight of a centrosymmetric para-disubstituted organic guest compound showing no second harmonic generation (SHG) by itself and having a molecular dipole moment in 100 parts by weight of polyoxyalkylene matrix, wherein the polyoxyalkylene matrix comprises oxyalkylene units of the formula (1) below at least as a partial structure including two or more successive oxyalkylene units in a proportion of 30 mol % or more in the polyoxyalkylene, Formula (1): (R—O)$_n$, wherein R denotes an alkylene group containing 1–6 carbon atoms, and n is 2–200,000; and the organic guest compound comprises a para-disubstituted benzene ring to which an electron donative group and an electron attractive group are attached to provide the molecular dipole moment, wherein said electron donative group is an amino group, alkyl group, alkoxy group, alkylamino group, hydroxyalkylamino group, dialkylamino group, hydroxyalkylalkylamino group, dihydroxyalkylamino group, mercapto group, or hydroxy group; and said electron attractive group is a nitro group, cyano group, halogen atom, trifluoromethyl group, carboxyl group, carboxy ester group, carbonyl group or sulfonyl group.

2. An optical modulation system according to claim 1, wherein said polyoxyalkylene is represented by the formula:

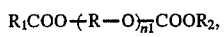

wherein $R_1$ and $R_2$ each denote an alkyl group having 1-20 carbon atoms, and n1 is 2-100,000.

3. An optical modulation system according to claim 1, wherein said polyoxyalkylene is represented by the formula:

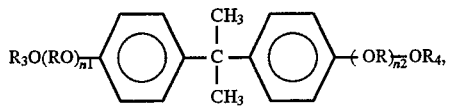

wherein $R_3$ and $R_4$ each denote hydrogen or an alkyl group having 1-20 carbon atoms and n1 and n2 are each 2 to 100,000.

4. An optical modulation system according to claim 1, wherein said polyoxyalkylene is represented by the formula:

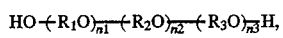

wherein $R_1$, $R_2$ and $R_3$ each denote an alkylene group having 1-6 carbon atoms and n1, n2 and n3 are each 2-100,000.

5. An optical modulation system according to claim 1, wherein said polyoxyalkylene is represented by the formula:

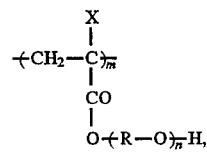

wherein X denotes H—, $CH_3$— or a halogen atom, and m is 10-100,000.

6. An optical modulation system according to claim 1, wherein said polyoxyalkylene is represented by the formula:

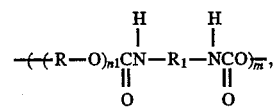

wherein n1 is 10-100,000, $R_1$ denotes an alkylene group having 1-18 carbon atoms, cyclohexylene group, phenylene group, biphenylene group, or tolylene group, and m is 10-10,000.

7. An optical modulation system according to claim 1, wherein said polyoxyalkylene is represented by the formula:

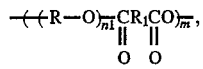

wherein n1 is 10-100,000, $R_1$ is an alkylene group having 1-18 carbon atoms, cyclohexylene group, phenylene group, biphenylene group, terphenylene group or tolyene group, and m is 10-10,000.

8. An optical modulation system according to claim 1, wherein said guest compound is a para-di-substituted benzene derivative represented by the formula:

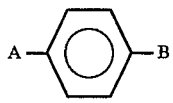

wherein A is the electron donative group and B is the electron attractive group.

9. An optical modulation system according to claim 1 wherein said solid solution is oriented so that the molecular dipole moment of the organic guest compound in a polyoxyalkylene matrix is aligned in one direction.

10. An optical modulation system according to claim 9, wherein said polyoxyalkylene is represented by the formula:

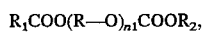

wherein $R_1$ and $R_2$ each denote an alkyl group having 1-20 carbon atoms, and n1 is 2-100,000.

11. An optical modulation system according to claim 9, wherein said polyoxyalkylene is represented by the formula:

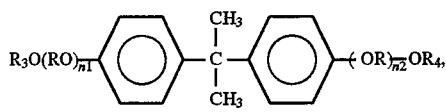

wherein $R_3$ and $R_4$ each denote hydrogen or an alkyl group having 1-20 carbon atoms and n1 and n2 are each 2 to 100,000.

12. An optical modulation system according to claim 9, wherein said polyoxyalkylene is represented by the formula:

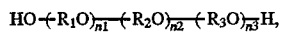

wherein $R_1$, $R_2$ and $R_3$ each denote an alkylene group having 1-6 carbon atoms and n1, n2 and n3 are each 2-100,000.

13. An optical modulation system according to claim 9, wherein said polyoxyalkylene is represented by the formula:

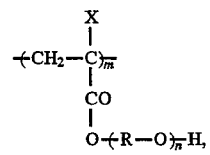

wherein X denotes H—, $CH_3$— or a halogen atom, and m is 10-100,000.

14. An optical modulation system according to claim 9, wherein said polyoxyalkylene is represented by the formula:

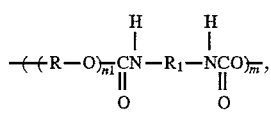

wherein n1 is 10–100,000, $R_1$ denotes an alkylene group having 1–18 carbon atoms, cyclohexylene group, phenylene group, biphenylene group, or tolylene group, and m is 10–10,000.

15. An optical modulation system according to claim 9, wherein said polyoxyalkylene is represented by the formula:

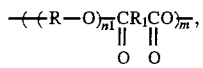

wherein n1 is 10–1000,000, $R_1$ is an alkylene group having 1–18 carbon atoms, cyclohexylene group, phenylene group, biphenylene group, terphenylene group or tolylene group, and m is 10–10,000.

16. An optical modulation system according to claim 9, wherein said guest compound is a para-di-substituted benzene derivative represented by the formula:

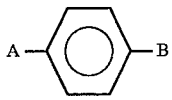

wherein A is the electron donative group and B is the electron attractive group.

* * * * *

UNITED STATES PATENT AND TRADEMARK OFFICE
CERTIFICATE OF CORRECTION

PATENT NO. : 5,626,797

DATED : May 6, 1997

INVENTOR(S): SEIZO MIYATA ET AL.     Page 1 of 4

It is certified that error appears in the above-identified patent and that said Letters Patent is hereby corrected as shown below:

Title page:

[54] TITLE

"NON LINEAR" SHOULD READ --NONLINEAR--.

COLUMN 1

Line 1, "NON LINEAR" should read --NONLINEAR--.

COLUMN 2

Line 6, "crystallied." should read --crystallized.--.

COLUMN 3

Line 52, "represents" should read --represented--.

COLUMN 5

Line 50, "derivatives" should read --derivatives and--.

COLUMN 7

Line 28, "quinoneline" should read --quinoline--.
Line 64, "haloge" should read --halogen--.

UNITED STATES PATENT AND TRADEMARK OFFICE
CERTIFICATE OF CORRECTION

PATENT NO. : 5,626,797
DATED       : May 6, 1997
INVENTOR(S) : SEIZO MIYATA ET AL.

It is certified that error appears in the above-identified patent and that said Letters Patent is hereby corrected as shown below:

COLUMN 8

Line 12, "amino-chlorobenzenesutfonic--" should read
        --amino-chlorobenzenesulfonic--.
    Line 22, "4oxide," should read --4-oxide,--.

COLUMN 9

Line 28, "5-amino-2-metoxyphenol," should read
        --5-amino-2-methoxyphenol,--.

COLUMN 10

Line 5, "4-nitrobenzojc" should read --4-nitrobenzoic--.
    Line 57, "orientd on" should read --oriented and--.
    Line 62, "compounds" should read --compound--.

COLUMN 11

Line 66, "X ray" should read --X-ray--.

COLUMN 12

Line 45, "ides." should read --sides.--.

COLUMN 13

Line 3, "wavelength" should read --(wavelength--.

UNITED STATES PATENT AND TRADEMARK OFFICE
CERTIFICATE OF CORRECTION

PATENT NO. : 5,626,797

DATED : May 6, 1997

INVENTOR(S): SEIZO MIYATA ET AL.

Page 3 of 4

It is certified that error appears in the above-identified patent and that said Letters Patent is hereby corrected as shown below:

COLUMN 14

Line 46, "abov" should read --above--.

COLUMN 15

Line 1, "(Mw):" should read --(Mw of about 1500):--.
    Line 6, "Rof" should read --of--.
    Line 18, "representd" should read --represented--.

COLUMN 16

Line 19, "film" should read --film.--.

COLUMN 18

Line 21, "claim 1" should read --claim 1, --.

UNITED STATES PATENT AND TRADEMARK OFFICE
CERTIFICATE OF CORRECTION

PATENT NO. : 5,626,797

DATED : May 6, 1997

INVENTOR(S) : SEIZO MIYATA ET AL.

It is certified that error appears in the above-identified patent and that said Letters Patent is hereby corrected as shown below:

<u>COLUMN 20</u>

Line 1, "10-1000,000," should read --10-100,000,--.

Signed and Sealed this

Twenty-first Day of October 1997

Attest:

BRUCE LEHMAN

Attesting Officer      Commissioner of Patents and Trademarks